US007697939B2

(12) United States Patent
Wada et al.

(10) Patent No.: US 7,697,939 B2
(45) Date of Patent: Apr. 13, 2010

(54) MOBILE TERMINAL DEVICE, RECEPTION QUALITY NOTIFICATION METHOD, BROADCAST BASE STATION DEVICE, RECEPTION QUALITY NOTIFICATION PROGRAM, AND STORAGE MEDIUM

(75) Inventors: Takeshi Wada, Tokyo (JP); Hiroki Kashiwagi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1159 days.

(21) Appl. No.: 11/233,070

(22) Filed: Sep. 23, 2005

(65) Prior Publication Data

US 2007/0054640 A1 Mar. 8, 2007

(30) Foreign Application Priority Data

Sep. 8, 2005 (JP) ............................ 2005-261401

(51) Int. Cl.
*H04W 72/00* (2009.01)

(52) U.S. Cl. .................. 455/452.2; 455/63.1; 370/332; 370/333

(58) Field of Classification Search ............. 455/226.1, 455/424, 425, 456.5, 456.6, 550.1, 575.1, 455/561, 440, 456.1, 457, 501, 525, 67.11, 455/63.1, 67.14, 115.1, 452.2, 135, 134, 455/161.3, 226.2, 226.3, 296, 278.1; 370/390, 370/432, 332, 333, 252, 336, 337, 331; 725/76, 725/63; 375/259, 260, 136, 147
See application file for complete search history.

(56) References Cited

U.S. PATENT DOCUMENTS 6,473,531 B1 * 10/2002 Kunitake .................... 382/239
6,751,401 B1 * 6/2004 Arai et al. ..................... 386/83
6,760,599 B1 * 7/2004 Uhlik ......................... 455/525
2002/0003798 A1 * 1/2002 Sato et al. .................. 370/390
2002/0152878 A1 * 10/2002 Akashi ........................ 84/609
2003/0050050 A1 * 3/2003 Higuchi et al. .............. 455/414
2003/0134589 A1 * 7/2003 Oba .......................... 455/3.03
2003/0227830 A1 * 12/2003 Lauke .......................... 369/7
2003/0233658 A1 * 12/2003 Keen et al. .................... 725/76
2004/0006541 A1 * 1/2004 Huddelston et al. ........... 705/51
2004/0142698 A1 * 7/2004 Pietraski .................. 455/452.2
2004/0192396 A1 * 9/2004 Fournier ..................... 455/563
2005/0079821 A1 * 4/2005 Bi ............................ 455/63.1
2005/0079886 A1 * 4/2005 Niwano ...................... 455/522
2005/0213674 A1 * 9/2005 Kobayashi .................. 375/259
2005/0272437 A1 * 12/2005 Ritter et al. .............. 455/452.2

(Continued)

FOREIGN PATENT DOCUMENTS

JP 10-185598 A 7/1998

(Continued)

*Primary Examiner*—Duc Nguyen
*Assistant Examiner*—Charles Chow
(74) *Attorney, Agent, or Firm*—Birch, Stewart, Kolasch & Birch, LLP

(57) ABSTRACT

A mobile terminal device receives and reproduces a broadcast program on air. At this moment, in the mobile terminal device, a reception quality measuring section measures the reception quality by measuring electric field intensity of the broadcast waves. A reception quality notifying section notifies the user of the measured reception quality in a form that is easily interpreted by the user. This allows the mobile terminal device to notify the user of whether the user can stably view the program.

17 Claims, 7 Drawing Sheets

U.S. PATENT DOCUMENTS

2006/0227718 A1* 10/2006 Wang et al. ................. 370/252
2007/0054624 A1* 3/2007 Kashiwagi ............... 455/67.13

FOREIGN PATENT DOCUMENTS

| | | | |
|---|---|---|---|
| JP | 2001-156659 | A | 6/2001 |
| JP | 2002-320165 | A | 10/2002 |
| JP | 2003-152617 | A | 5/2003 |
| JP | 2004-153481 | A | 5/2004 |
| JP | 2004-166078 | A | 6/2004 |
| JP | 2004-356873 | A | 12/2004 |
| JP | 2005-123859 | A | 5/2005 |
| JP | 2005-204122 | A | 7/2005 |
| WO | WO-2004/080011 | A1 | 9/2004 |

* cited by examiner

| CH1 MUSIC | CH2 SPORTS | CH3 MOVIE | CH4 VARIETY |
|---|---|---|---|
| QPSK 1/2 | 16QAM 1/2 | QPSK 1/3 | 16QAM 2/3 |
| 65 | 70 | 80 | 85 |

MOBILE TERMINAL DEVICE, RECEPTION QUALITY NOTIFICATION METHOD, BROADCAST BASE STATION DEVICE, RECEPTION QUALITY NOTIFICATION PROGRAM, AND STORAGE MEDIUM

This Nonprovisional application claims priority under 35 U.S.C. §119(a) on Patent Application No. 261401/2005 filed in Japan on Sep. 8, 2005, the entire contents of which are hereby incorporated by reference.

FIELD OF THE INVENTION

The present invention relates to a mobile terminal device which receives and reproduces a broadcast program. Further, the present invention relates to a reception quality notification method for notifying a user of reception quality of the broadcast program in the mobile terminal device. Still further, the present invention relates to a reception quality notification program which causes a computer to operate as the mobile terminal device. Yet further, the present invention relates to a computer-readable storage medium storing therein the reception quality notification program. Further, the present invention relates to a broadcast base station device which acquires reception quality and a current location of the mobile terminal device from the mobile terminal device.

BACKGROUND OF THE INVENTION

In recent years, a merger between communications and broadcasting has advanced. Specifically, a mobile terminal device capable of data communications, and reception and reproduction of a broadcast program has been developed. A user who uses such a mobile terminal device, for example, can view a broadcast program during traveling while transmitting or receiving an electronic mail. Further, the idea of changing a transmission scheme of a broadcast program to be broadcasted according to content of the broadcast program has been conceived. This allows for enhancement of transmission efficiency in entire bands.

A typical television set is installed at a place for its use. Therefore, environmental conditions for the propagation of broadcast waves are constant and unchanged except in cases where a serious climate change occurs. On the contrary, the mobile terminal device capable of receiving a broadcast program can be used during traveling. Therefore, change of a location of the mobile terminal device significantly changes the environmental conditions for the propagation of broadcast waves A conventional mobile terminal device reproduces a received broadcast program as it is. Therefore, the user is unaware of decrease in reception quality of the broadcast program caused due to a mobile terminal device's site having poor environmental conditions for the propagation. In the worst case, reproduction of the broadcast program is interrupted when the user is viewing the broadcast program. This annoys the user. Thus, for the user using the conventional mobile terminal device, there is no way of knowing in advance whether he/she can continue to stably view a currently viewing broadcast program.

In the event that reception quality of the broadcast program becomes worse halfway through viewing of the broadcast program so that it is impossible to view the broadcast program, a viewing time before the event becomes waste of time. In view of such circumstances, a mobile terminal device having the function of capable of recording the broadcast program, has been developed. In the mobile terminal device having the recording function, if the broadcast program is recorded in an unbearable condition because of a poor reception quality of the broadcast program, the user will not view the recorded broadcast program later. In this case, battery and memory of the mobile terminal device is used wastefully.

SUMMARY OF THE INVENTION

The present invention has been attained to solve the above problem, and an objective of the present invention is to provide a mobile terminal device, reception quality notification method, reception quality notification program, and storage medium all of which are capable of letting a user know about whether or not the broadcast program can be stably viewed.

In order to solve the above problem, a mobile terminal device according to the present invention is a mobile terminal device which receives and reproduces a broadcast program on air, comprising: reception quality measuring means which measures reception quality of the broadcast program; and reception quality notifying means which notifies a user of the measured reception quality.

According to the above arrangement, the mobile terminal device receives and reproduces a broadcast program on air. A user carrying this mobile terminal device can view a broadcast program while traveling. At this time, in the mobile terminal device, the reception quality measuring means measures the reception quality of the received broadcast program, for example, by measuring electric field intensity or the like of the received broadcast waves.

Further, in the mobile terminal device, the reception quality notifying means notifies the user of the reception quality measured by the reception quality measuring means. At this time, the reception quality notifying means notifies the user of the measured reception quality in a form that is easily interpreted by the user. A color corresponding to the degree of reception quality is given on outer edge of a display, for example, in the following manners: if reception quality is good, a color of blue is given on the outer edge of the display, and if reception quality is poor, a color of yellow is given on the outer edge of the display. The user can objectively know about reception quality of a broadcast program currently viewed by the user by checking what color is given on the outer edge of the display.

Thus, the mobile terminal device brings about the effect of letting the user know about whether the user can stably view the program.

In order to solve the above problem, a reception quality notification method according to the present invention is a reception quality notification method for causing a mobile terminal device which receives and reproduces a broadcast program on air to notify a user of reception quality of the broadcast program, the method comprising: a reception quality measuring step of measuring reception quality of the broadcast program; and a reception quality notifying step of notifying the user of the measured reception quality.

The above arrangement brings about the same effect as the mobile terminal device according to the present invention.

In order to solve the above problem, a broadcast base station device according to the present invention comprises: reception quality acquiring means which acquires, from the foregoing mobile terminal device, the reception quality and the positional information of the mobile terminal device; and quality map creating means which creates a quality map representing reception quality distribution in a predetermined service area, the quality map including the reception quality and the positional information associated with each other.

The above arrangement brings about the effect of providing a broadcast base station device capable of creating a quality map representing an accurate reception quality distribution of a broadcast program on air, the quality map reflecting an actual reception quality of the broadcast program.

In order to solve the above problem, a broadcasting system according to the present invention includes the foregoing mobile terminal device and the broadcast station device.

The above arrangement brings about the effect of providing the broadcasting system capable of letting the user know about whether or not the program can be stably viewed.

The following description will sufficiently clarify further objects, characteristics, and excellent points of the present invention. Further, advantages of the invention will be clarified with reference to the ensuing detailed description taken in conjunction with the accompanying drawings.

DESCRIPTION OF THE EMBODIMENTS

The following will describe one embodiment of the present invention with reference to FIGS. 1 through 9.

(Details of Broadcasting System 50)

Figure 1:
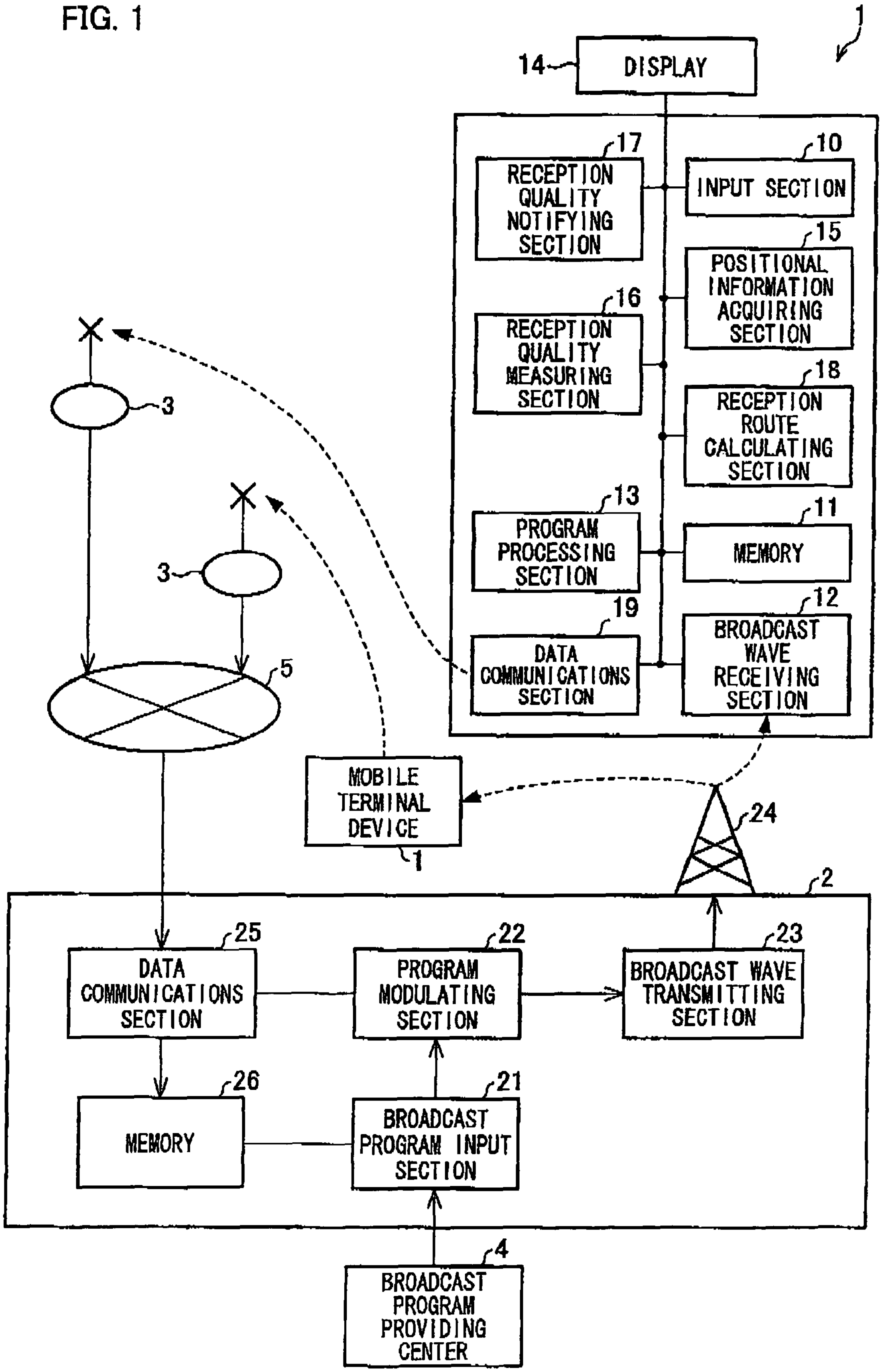
FIG. 1 is a block diagram illustrating details of a broadcasting system according to one embodiment of the present invention.

Details of a broadcasting system 50 including a mobile terminal device 1 will be described below with reference to FIG. 1. FIG. 1 is a block diagram illustrating details of the broadcasting system 50 according to one embodiment of the present invention. As illustrated in FIG. 1, the broadcasting system 50 includes the mobile terminal device 1, a broadcast base station device 2, a communications base station device 3, and a broadcast program providing center 4.

The broadcast program providing center 4 provides the broadcast base station device 2 with a predetermined broadcast program. The broadcast base station device 2 modulates the broadcast program provided thereto to generate broadcast waves, and transmits the generated broadcast waves to the mobile terminal device 1. The mobile terminal device 1 receives the broadcast waves transmitted from the broadcast base station device 2. Further, the mobile terminal device 1 demodulates the received broadcast waves to obtain the broadcast program. The mobile terminal device 1 reproduces the broadcast program by displaying it on a display 14 or other operation. With this arrangement, a user carrying the mobile terminal device 1 can view the broadcast program provided by the broadcast base station device 2 while traveling. The communications base station device 3 receives predetermined data transmitted from the mobile terminal device 1. Further, the communications base station device 3 provides the received data to the broadcast base station device 2 via a communications network 5. Thus, the communications base station device 3 serves as a relay station for relaying various kinds of data to be provided from the mobile terminal device 1 to the broadcast base station device 2.

(Mobile Terminal Device 1)

The following will describe the mobile terminal device 1 with reference to FIG. 1. As illustrated in FIG. 1, the mobile terminal device 1 includes an input section 10, memory 11, a broadcast wave receiving section 12, a program processing section 13, a display 14, a positional information acquiring section 15 (positional information acquiring means), a reception quality measuring section 16 (reception quality measuring means, reception quality predicting means), a reception quality notifying section 17 (reception quality notifying means), a reception route calculating section 18 (reception quality predicting means), and a data communications section 19.

(Input Section 10)

The input section 10 accepts various kinds of user's operations and inputs. For example, the input section 10 accepts information on channel selected by the user. Still further, the input section 10 accepts information on destination selected by the user. Yet further, the input section 10 accepts user's entry of a designated time at which the mobile terminal device 1 is to record a broadcast program.

(Memory 11)

The memory 11 stores various kinds of data processed by the mobile terminal device 1. For example, the memory 11 stores an electronic program guide acquired by the mobile terminal device 1. The memory 11 is a typical nonvolatile memory or hard disk. For the mobile terminal device 1 having a recording capability, the memory 11 stores recorded broadcast programs.

(Broadcast Wave Receiving Section 12)

The broadcast wave receiving section 12 receives broadcast waves transmitted from the broadcast base station device 2. The broadcast wave receiving section 12 outputs the received broadcast waves to the program processing section 13 and the reception quality measuring section 16. At this point, the mobile terminal device 1 can demodulate almost all the signals received if reception condition of broadcast waves is good. On the other hand, if the reception condition of broadcast waves is poor, the mobile terminal device 1 can demodulate part of the signals received. The reception condition of the broadcast waves depends on a distance between the broadcast base station device 2 and the mobile terminal device 1, orientation of the mobile terminal device 1 (orientation of an antenna), and various kinds of buildings which exist in a service area of the broadcast base station device 2.

(Program Processing Section 13)

The program processing section 13 demodulates the broadcast waves received by the broadcast wave receiving section 12 to obtain data of the broadcast program. Further, the program processing section 13 provides displays of the broadcast program represented by the obtained data on the display 14.

In this manner, the broadcast program received by the mobile terminal device 1 is reproduced.

(Display 14)

The display 14 provides displays of various kinds of information on the mobile terminal device 1 to notify the user of them. Further, the display 14 provides displays of texts, images, and moving pictures contained in a broadcast program Still further, the display 14 provides display of an electronic program guide (EPG), if necessary The display 14 is a liquid crystal display, for example.

(Positional Information Acquiring Section 15)

The positional information acquiring section 15 acquires information on current location of the mobile terminal device 1 by using arbitrary means. At this point, the positional information acquiring section 15 uses the GPS (Global Positioning System) system, for example. The positional information acquiring section 15 generates positional data representing the acquired position and then stores it into the memory 11.

(Reception Quality Measuring Section 16)

The reception quality measuring section 16 measures reception quality of a broadcast program. Specifically, the reception quality measuring section 16 measures reception quality of the broadcast waves received by the broadcast wave receiving section 12. The reception quality measuring section 16 generates quality data representing the measured reception quality and stores it into the memory 11.

The reception quality measuring section 16 measures reception quality of broadcast waves by using arbitrary means. For example, the reception quality measuring section 16 measures the reception quality in accordance with electric field intensity of broadcast waves. The electric field intensity of broadcast waves decreases with distance from the broadcast base station device 2. Lower-intensity radio waves increase a bit error rate, which deteriorates reception quality of a broadcast program received by the mobile terminal device 1. Usually, the farther the mobile terminal device 1 is moved away from the broadcast base station device 2, the lower reception quality of a broadcast program becomes.

(Reception Quality Notifying Section 17)

The reception quality notifying section 17 notifies the user of the broadcast program's reception quality measured by the reception quality measuring section 16, by using arbitrary means. For example, the degrees of reception quality are notified to the user by giving the user different colors on outer edge of a display. Specifically, if reception quality is good, the reception quality notifying section 17 gives the user a color of blue on the outer edge of the display. If reception quality is poor, the reception quality notifying section 17 gives the user a color of yellow on the outer edge of the display. If reception quality of a broadcast program is so poor that the broadcast program cannot be displayed on the display 14, the reception quality notifying section 17 gives the user a color of red on the outer edge of the display.

(Reception Route Calculating Section 18)

The reception route calculating section 18 calculates a route on which the user can continuously view a broadcast program from a current location of the mobile terminal device 1 to a destination entered by the user. For this calculation, the reception route calculating section 18 uses a reception quality map representing reception quality distribution, created by the broadcast base station device 2. In addition, a so-called roadmap is used. Details of a route calculated by the reception route calculating section 18 will be described later.

(Data Communications Section 19)

The data communications section 19 acquires the electronic program guide via the communications network 4 in accordance with a user's instruction. The data communications section 19 stores the acquired electronic program guide into the memory 11. At this point, the data communications section 19 acquires the electronic program guide including (i) transmission modes for modulation of the respective broadcast programs and (ii) reference qualities required for the respective broadcast programs, (i) and (ii) being associated with each other. Details of this matter will be described later. Note that, the term "transmission mode" herein means a modulation scheme, modulation rate, coding rate, coding scheme, or the degree of error tolerance.

The data communications section 19 notifies the broadcast base station device 2 of (I) the reception quality measured by the reception quality measuring section 16 and (II) the location of the mobile terminal device 1 acquired by the positional information acquiring section 15. Specifically, the data communications section 19 reads out the quality data and the positional data from the memory 11 and then transmits them to the communications base station device 3 which exists within data communications coverage of the mobile terminal device 1. At this point, the data communications section 19 transmits pieces of data at predetermined time intervals. Alternatively, the data communications section 19 may transmit the quality data and the positional data to the communications base station device 3 if reception quality of broadcast waves becomes lower than a value predetermined in the mobile terminal device 1. Further alternatively, the data communications section 19 may transmit the quality data and the positional data to the communications base station device 3 if having judged from the positional data that the mobile terminal device 1 exists at a preset place.

(Broadcast Base Station Device 2)

The broadcast base station device 2 will be described below with reference to FIG. 1. As illustrated in FIG. 1, the broadcast base station device 2 includes a broadcast program input section 21, a program modulating section 22, a broadcast wave transmitting section 23, a broadcast antenna 24, a data communications section 25 (reception quality acquiring means), and memory 26.

(Broadcast Program Input Section 21)

As described above, the broadcast program providing center 4 provides a broadcast program to the broadcast base station device 2. In the broadcast base station device 2, the broadcast program input section 21 accepts the broadcast program provided from the broadcast program providing center 4. The broadcast program input section 21 outputs the incoming broadcast program to the program modulating section 22.

(Program Modulating Section 22)

The program modulating section 22 modulates a broadcast program. At this point, the program modulating section 22 modulates the broadcast program by using a normal transmission mode. For example, various kinds of transmission modes such as BPSK, QPSK, 16 QAM, and 64 QAM are used. The program modulating section 22 outputs the modulated broadcast program to the broadcast wave transmitting section 23.

(Broadcast Wave Transmitting Section 23 and Broadcast Antenna 24)

The broadcast wave transmitting section 23 transmits the broadcast waves resulting from the modulation of the broadcast program, via the broadcast antenna 24 to the mobile terminal device 1. The broadcast antenna 24 can be an antenna that outputs broadcast waves at angles of 360°. Alternatively, the broadcast antenna 24 may be, for example, realized by combination of partial antennas that each outputs broadcast waves at angles of 120° so as to output broadcast waves at angles of 360°.

(Data Communications Section 25)

As described above, the communications base station device 3 receives the quality data and the positional data transmitted from the mobile terminal device 1, and provides them via the communications network 5 to the broadcast base station device 2. In the broadcast base station device 2, the data communications section 25 receives the quality data and positional data provided from the communications base station device 3. The data communications section 25 associates the received quality data and positional data with each other and stores them into the memory 26. This allows the data communications section 25 to create the reception quality map that represents reception quality distribution of the broadcast program in a service area covered by the broadcast base station device 2.

Further, in response to a request from the mobile terminal device 1, the data communications section 25 reads out reception quality map data stored in the memory 26, and then transmits it via the communications network 5 to the mobile terminal device 1.

(Memory 26)

The memory 26 stores various kinds of data processed by the broadcast base station device 2. For example, the memory 26 stores the reception quality map data created by the broadcast base station device 2. The memory 26 is hard disk, for example.

(Reach of Broadcast Waves)

Figures 2, 3:
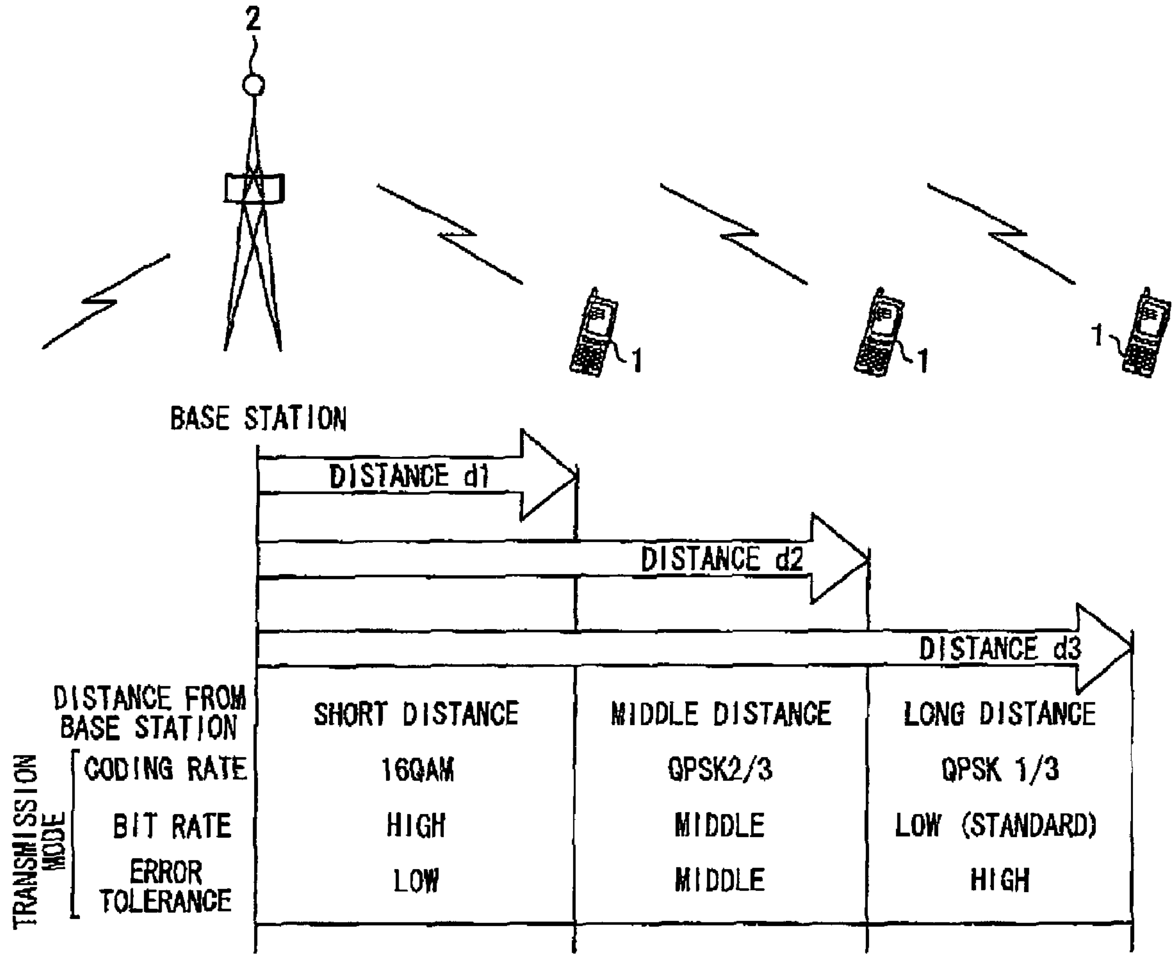
FIG. 2 is a drawing illustrating a relationship between a transmission mode applied to a broadcast program and a maximum reach of broadcast waves.
FIG. 3 is a drawing illustrating a relationship of each broadcast program transmitted from the broadcast base station device 2, a transmission mode applied to the broadcast program, a reference quality set to the broadcast program.

In the broadcasting system 50, the reach of broadcast waves varies depending upon a broadcast program transmission mode. That is, the broadcast base station device 2 can change a maximum reach of broadcast program distributed from the broadcast base station device 2 by changing a transmission mode to be used. This is described below with reference to FIG. 2. FIG. 2 is a drawing illustrating a relationship between a transmission mode applied to a broadcast program and a maximum reach of broadcast waves.

As described above, the program modulating section 22 can modulate broadcast programs, using respectively different transmission modes. For example, one broadcast program is modulated by 16 QAM, whereas another broadcast program is modulated by QPSK. Here, as illustrated in FIG. 2, when the program modulating section 22 modulates a broadcast program using 16QAM, broadcast waves reach to a distance d1. In this case, the broadcast program is transmitted at a high bit rate and with a low degree of error tolerance That is, the broadcast program is required to be of a high reception quality, and there is a high possibility that errors could occur when broadcast waves are demodulated. This allows the mobile terminal device 1 to demodulate the broadcast program of a high quality when the mobile terminal device 1 exists within the distance d1 from the broadcast base station device 2. On the other hand, when the mobile terminal device 1 exists beyond the distance d1 from the broadcast base station device 2, the mobile terminal device 1 cannot demodulate the same broadcast program.

Further, when the program modulating section 22 modulates a broadcast program using QPSK2/3, broadcast waves reach to a distance d2. That is, the broadcast program is required to be of a medium reception quality, and there is a medium possibility that errors could occur when broadcast waves are demodulated. This allows the mobile terminal device 1 to demodulate the broadcast program of a medium quality when the mobile terminal device 1 exists within the distance d2 from the broadcast base station device 2. On the other hand, when the mobile terminal device 1 exists beyond the distance d2 from the broadcast base station device 2, the mobile terminal device 1 cannot demodulate the same broadcast program.

Still further, when the program modulating section 22 modulates a broadcast program using QPSK1/3, broadcast waves reach to a distance d3. That is, the broadcast program is required to be of a low reception quality, and there is a low possibility that errors could occur when broadcast waves are demodulated. This allows the mobile terminal device 1 to demodulate the broadcast program of a low quality when the mobile terminal device 1 exists within the distance d3 from the broadcast base station device 2. On the other hand, when the mobile terminal device 1 exists beyond the distance d3 from the broadcast base station device 2, the mobile terminal device 1 cannot demodulate the same broadcast program.

(Examples of Transmission Modes for the Respective Broadcast Programs)

Thus, the reach of broadcast waves changes depending upon transmission modes for modulation of a broadcast program. The broadcast base station device 2 modulates individual broadcast programs using different transmission modes. That is, a broadcast program is modulated according to a transmission mode appropriate to a required quality of the broadcast program. At this point, a predetermined reference quality is set to each broadcast program. The mobile terminal device 1 acquires transmission modes and set reference qualities of the respective broadcast programs according to the electronic program guide. Examples of the transmission modes for the respective broadcast programs will be described with reference to FIG. 3.

FIG. 3 is a drawing illustrating a relationship of broadcast programs transmitted from the broadcast base station device 2, transmission modes applied to the respective broadcast programs, reference qualities set to the respective broadcast programs. As illustrated in FIG. 3, the program modulating section 22 modulates, for example, a music program of Channel 1 using QPSK1/2. To this broadcast program, "65" is preset as a reference quality. Further, the program modulating section 22 a sports program of Channel 2 using 16 QAM1/2. To this broadcast program, "70" is preset as a reference quality. Still further, the program modulating section 22 modulates a movie program of Channel 3 using QPSK1/3. To this broadcast program, "80" is preset as a reference quality. Yet Further, the program modulating section 22 modulates a variety program of Channel 4 using 16 QAM2/3. To this broadcast program, "85" is preset as a reference quality.

In the broadcasting system 50, both the transmission mode and the reference quality for each broadcast program are defined in advance in the electronic program guide. By acquiring the electronic program guide having defined transmission mode and reference quality, the mobile terminal device 1 can know a transmission mode and reference quality of each broadcast program in advance.

(Process Flow of Notifying the User of Reception Quality)

Figure 4:
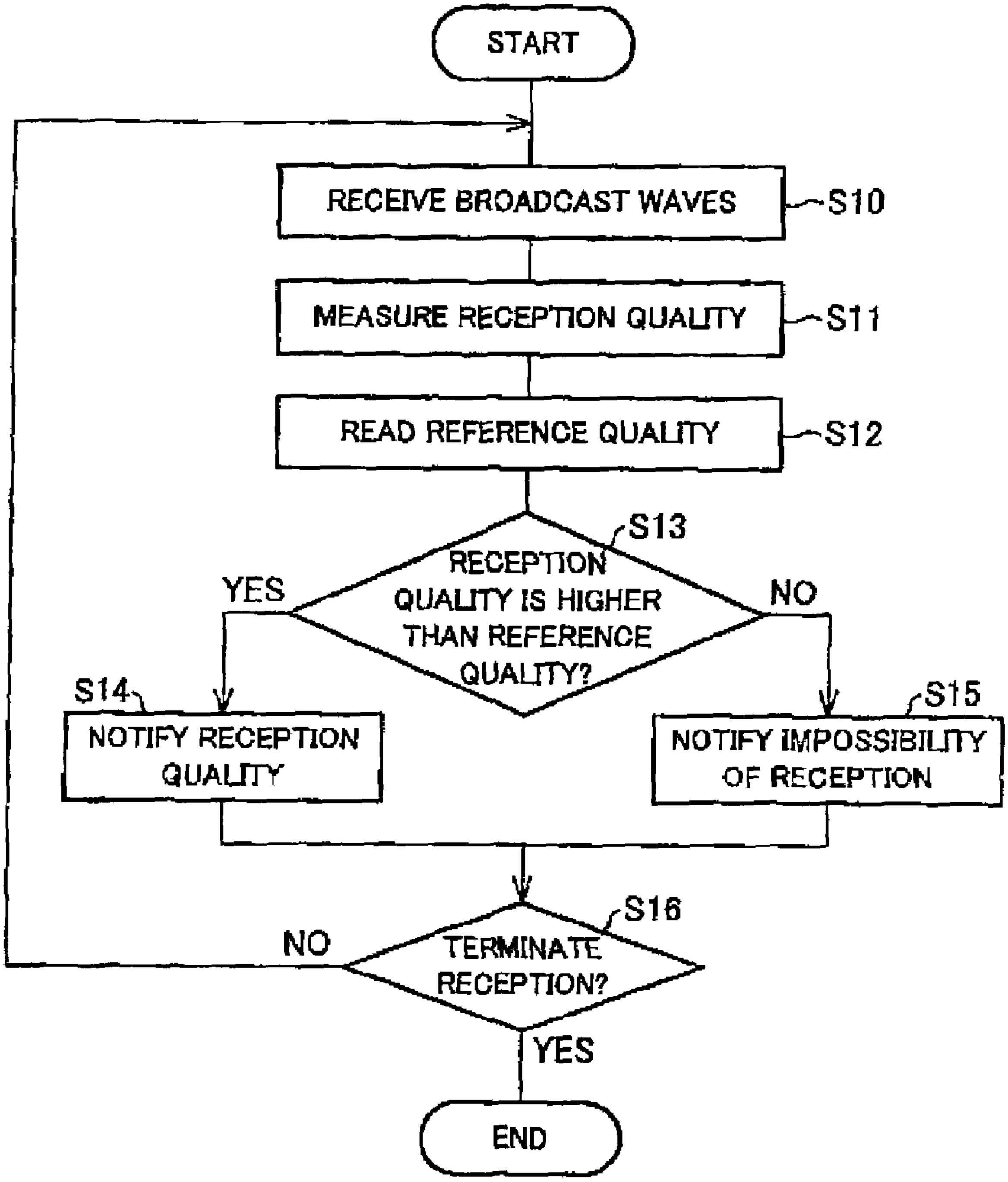
FIG. 4 is a flowchart illustrating an exemplary flow of the process in which the mobile terminal device measures reception quality of a broadcast program and notifies the user of the measured reception quality.

The following will describe a flow of the process in which the mobile terminal device 1 measures reception quality of a broadcast program and notifies the user of the measured reception quality. FIG. 4 is a flowchart illustrating an exemplary flow of the process in which the mobile terminal device 1 measures reception quality of a broadcast program and notifies the user of the measured reception quality.

(Reception and Display of Broadcast Waves)

In the broadcasting system 50, the broadcast wave transmitting section 23 of the broadcast base station device 2 transmits broadcast waves via the broadcast antenna 24 to the mobile terminal device 1. In the mobile terminal device 1, the broadcast wave receiving section 12 receives the broadcast waves (Step S10). The broadcast wave receiving section 12 outputs the received broadcast waves to the reception quality measuring section 16.

(Acquiring Reference Quality)

The broadcast wave transmitting section 23 superimposes data representing reference quality of the broadcast program on the broadcast waves, for transmission of the broadcast waves. This allows the broadcast wave receiving section 12 to acquire reference quality data of the broadcast program from the received broadcast waves and store them into the memory 11.

(Measuring Reception Quality)

The reception quality measuring section 16 measures reception quality of the broadcast program in accordance with the received broadcast waves (Step S11). At this point, the reception quality measuring section 16 measures the reception quality, for example, by measuring electric field intensity of the broadcast waves. The reception quality measuring section 16 generates reception quality data representing the measured reception quality, and stores them into the memory 11.

(Notifying Reception Quality)

Through the foregoing steps, the reception quality data and the reference quality data are stored in the memory 11. Next, the reception quality notifying section 17 accesses the memory 11 to read the reception quality data and the reference quality data from the memory 11. By using the read two pieces of data, the reception quality notifying section 17 compares between the measured reception quality of the broadcast program and the reference quality preset to the same broadcast program. From a result of the comparison, the reception quality notifying section 17 determines whether or not the reception quality is higher than the reference quality (Step 513).

Figure 5:
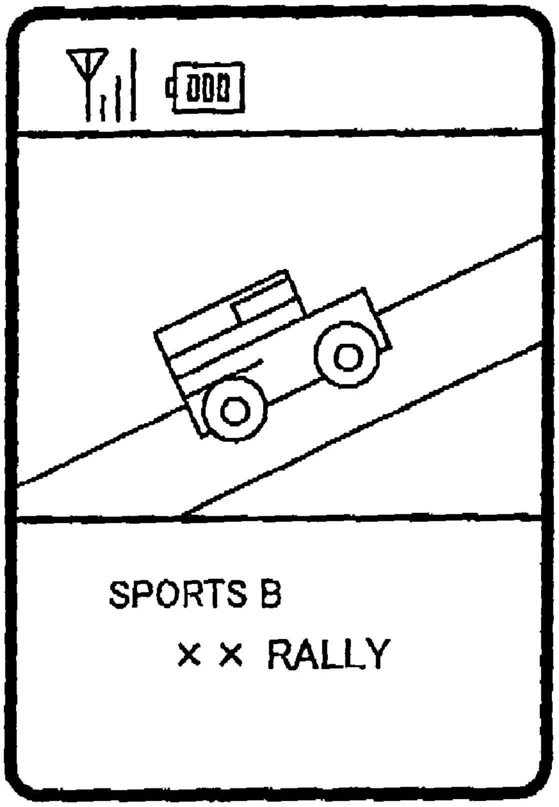
FIG. 5 is a drawing illustrating an example of giving a color representing the reception quality on outer edge of the display.

In Step S13, if having judged that the reception quality is higher than the reference quality (Yes), the reception quality notifying section 17 notifies the user of the reception quality of the broadcast program. For example, as illustrated in FIG. 5, the reception quality notifying section 17 notifies the user of a good reception quality of the broadcast program at the current time, by giving the user a color of blue on outer edge of the display.

(Notifying Impossibility of Reception)

On the other hand, if having judged that the reception quality is lower than the reference quality (No), the reception quality notifying section 17 notifies the user of impossibility of receiving the broadcast program. For example, a prescribed message, like "receiving the broadcast program is impossible", is provided on the display 14. This allows the user to know that he/she is now in a place beyond coverage of the broadcast program.

After having notified to the user, the mobile terminal device 1 determines whether reception of the broadcast waves will be terminated (Step S16). In Step S16, if having determined to terminate reception of the broadcast waves (Yes), the mobile terminal device 1 terminates the reception quality notifying process. On the other hand, if having determined not to terminate reception of the broadcast waves, the process returns to Step S10, and the broadcast wave receiving section 12 receives the broadcast waves again.

(Operations and Effects)

As described above, in the mobile terminal device 1, the reception quality measuring section 16 measures reception quality of a received broadcast program. The reception quality notifying section 17 notifies the user of the measured reception quality. This allows the user to know reception quality of the broadcast program selected by him/her in a specific form. Therefore, for example, when the user knows that reception quality of the broadcast program is good, the user decides to keep on viewing the broadcast program on the spot. On the other hand, if reception quality of the broadcast program is poor, the user can try to improve reception quality of the broadcast program by taking some kind of action, such as traveling to a good reception area. Thus, the mobile terminal device is capable of informing the user of whether or not a program will be provided to the user in a stable condition.

(Notifying when Reception Quality is Below a Given Value)

The reception quality notifying section 17 may unconditionally notify the user of reception quality of a broadcast program. In this case, the reception quality notifying section 17 fully informs the user of reception quality of the broadcast program in written form, like a report. Alternatively, the reception quality notifying section 17 may notify the user of the measured reception quality only when the measured reception quality is below a given value. In this case, the reception quality notifying section 17 can warn the user of a poor reception quality of the broadcast program. Note that, a given value in this case is preset to each broadcast program. That is, the broadcast wave transmitting section 23 of the broadcast base station device 2 transmits, to the mobile terminal device 1, the broadcast waves on which a criteria value to judge whether the reception quality be notified to the user is superimposed.

(Notifying when a Designated Recording Time Approaches)

The reception quality notifying section 17 may notify the user of reception quality of a broadcast program when a designated time at which the mobile terminal device 1 is preset by the user to record the broadcast program approaches.

In this case, the mobile terminal device 1 records a user-designated broadcast program into the memory 11. For this recording, the mobile terminal device 1 includes a predetermined recording section. The user enters a designated time for recording the broadcast program into the mobile terminal device 1. The input section 10 stores data representing the designated time for recording entered by the user into the memory 11. The reception quality measuring section 16 checks a current time on a regular basis by consulting a local clock included in the mobile terminal device 1. With this arrangement, when it is judged that a current time approaches the designated recording time entered by the user, e.g. when it is judged that the current time is five minutes before the designated recording time, reception quality of broadcast waves is measured. The reception quality notifying section 17 notifies the user of the measured reception quality as a predicted reception quality of the user-designated broadcast program for recording.

With this arrangement, the user can know in advance whether or not the user-designated broadcast program will be recorded in good conditions. Therefore, prediction of a poor reception quality makes it possible to prevent wasteful recording of the broadcast program. Accordingly, it is possible to prevent wasteful usage of battery and memory of the mobile terminal device 1.

(Predicting Future Reception Quality)

The reception quality notifying section 17 may predict future course of reception quality of the broadcast program being viewed by the user, and then notify it to the user.

In this arrangement, the reception quality measuring section 16 accumulates measured reception qualities of the broadcast program in time sequence. Specifically, the reception quality measuring section 16 stores, in the memory 11, the measured reception qualities associated with the times at which the reception qualities have been measured. The reception quality notifying section 17 reads out, from the memory 11, data representing a past reception quality of the broadcast program in a preset past time. By using the read data, the reception quality notifying section 17 determines by calculation the past progression of the reception quality of the broadcast program over time. In accordance with the determined past progression of the reception quality over time, the reception quality measuring section 16 predicts future course of the reception quality of the broadcast program. With this, the reception quality notifying section 17 notifies the user of the predicted reception quality.

When having determined by calculation that reception quality of the broadcast program was stably high (higher than a reference quality) for the preset past time (e.g. past 30 minutes), the reception quality notifying section 17 predicts that the reception quality of the broadcast program will maintain stable not only at the current time but also for the future (e.g. next 30 minutes), and then notifies the user of the prediction. On the other hand, when having determined by calculation that reception quality of the broadcast program gradually decreased (downward-sloping reception quality) for the preset past time (e.g. past 30 minutes), the reception quality notifying section 17 predicts that the reception quality of the broadcast program being viewed by the user will gradually decrease for the future, and notifies the user of the prediction.

With this arrangement, the user who has been notified a result of the prediction can decide, in accordance with the prediction result, whether or not he/she will keep on viewing the broadcast program. For example, if reception quality of the broadcast program will be good in the future, the user decides to keep on viewing the broadcast program. On the other hand, if reception quality of the broadcast program will decrease in the future, the user decides to move to another place for viewing the broadcast program. Thus, the mobile terminal device 1 can urge the user to take an action best-suited to viewing a broadcast program.

(Notifying when it is Detected that the Mobile Terminal Device 1 is Put on Charge)

The reception quality notifying section 17 may notify the user of reception quality of a broadcast program when the mobile terminal device 1 is put on charge. For this arrangement, the mobile terminal device 1 includes a predetermined state-of-charge detecting section for detecting that the mobile terminal devices 1 is put on charge. This state-of-charge detecting section, for example, judges that the mobile terminal device 1 is connected to a battery charger and is put on charge, when having detected that a given voltage is fed to the mobile terminal device 1. When the state-of-charge detecting section has judged that the mobile terminal device 1 is put on charge, the reception quality measuring section 16 measures the reception quality of the broadcast program, and the reception quality notifying section 17 notifies the user of the measured reception quality. Therefore, by notifying the user of the reception quality of the broadcast program at a particular location, the reception quality notifying section 17 can notify the user of the reception quality for the case when the user keeps on viewing the broadcast program on the spot.

(Predicting on the Basis of Schedule)

The reception quality notifying section 17 may predict reception quality of a broadcast program at a user's future scheduled destination, and then notify the user of it. In this arrangement, the user enters a future schedule into the mobile terminal device 1. In the mobile terminal device 1, the input section 10 accepts the schedule entered by the user and stores it into the memory 11. The reception quality notifying section 17 reads out the user's schedule from the memory 11. For example, the reception quality notifying section 17 reads out an address of the destination that the user will visit 30 minutes later. The reception quality notifying section 17 predicts reception quality of the broadcast program at this address on the basis of the quality map representing reception quality distribution of the broadcast program. This allows the user to know in advance whether he/she can view an intended broadcast program at the destination.

(Notifying Predicted Reception Qualities of the Respective Broadcast Programs)

As described above, the reception quality measuring section 16 measures reception quality of the broadcast program that the user is currently viewing. Accordingly, the reception quality notifying section 17 notifies the user of the reception quality of the broadcast program that the user is currently viewing. In addition to the reception quality of the broadcast program that the user is currently viewing, the reception quality notifying section 17 can predict (i) reception quality of a broadcast program that is currently unselected by the user and (ii) reception quality of a broadcast program that is to be broadcasted in the future, and notify the user of the reception qualities (i) and (ii). This will describe below.

Figure 6:
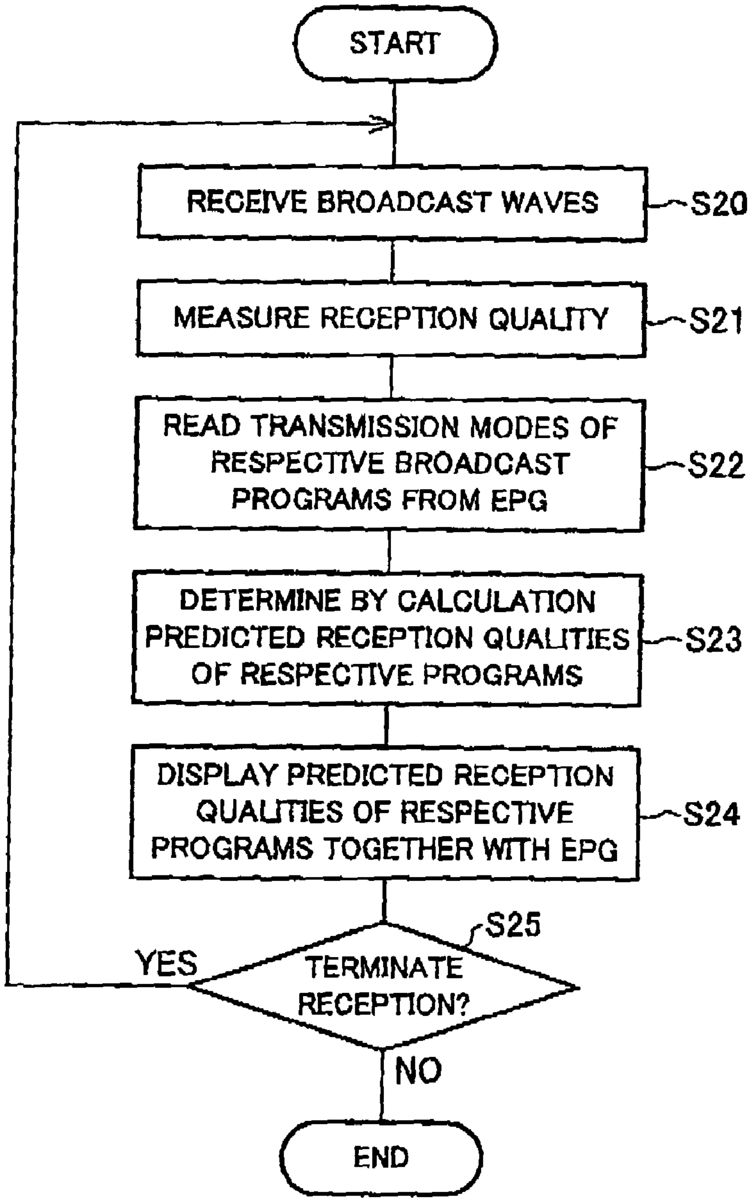
FIG. 6 is a flowchart illustrating an exemplary flow of a process in which the mobile terminal device predicts reception qualities of the respective broadcast programs in accordance with their reference qualities stored in the electronic program guide, and notifies the user of the reception qualities.

FIG. 6 is a flowchart illustrating an exemplary flow of a process in which the mobile terminal device 1 predicts reception qualities of the respective broadcast programs in accordance with their reference qualities stored in the electronic program guide, and notifies the user of the reception qualities.

(Acquiring the Electronic Program Guide)

In an example of the process illustrated in FIG. 6, the mobile terminal device 1 acquires the electronic program guide in advance. In the electronic program guide acquired by the mobile terminal device 1, each broadcast program has previously defined (a) transmission mode for modulation of the broadcast program and (b) reference quality of the broadcast program. In the broadcasting system 50, such an electronic program guide may be transmitted from the broadcast base station device 2 to the mobile terminal device 1. Alternatively, the mobile terminal device 1 may access an intended server (not shown) having the electronic program guide through the data communications section 19 to acquire the electronic program guide from the server. In each case, the electronic program guide acquired by the mobile terminal device 1 is stored in the memory 11.

(Reception of Broadcast Waves)

In the broadcasting system 50, at the side of the broadcast base station device 2, the broadcast wave transmitting section 23 transmits broadcast waves via the broadcast antenna 24 to the mobile terminal device 1. At the side of the mobile terminal device 1, in the state of having acquired the electronic program guide, the broadcast wave receiving section 12 receives broadcast waves (Step S20). The broadcast wave receiving section 12 outputs the received broadcast waves to the reception quality measuring section 16.

(Measuring Reception Quality)

The reception quality measuring section 16 measures reception quality of the broadcast program that the user is currently viewing, in accordance with the incoming broadcast waves (Step S21). At this point, the reception quality measuring section 16 measures the reception quality, for example, by measuring electric field intensity of the broadcast waves. The reception quality measuring section 16 generates reception quality data representing the measured reception quality, and stores them into the memory 11.

(Notifying Reception Quality)

Next, the reception quality notifying section 17 accesses the memory 11 to read out transmission modes of the respective broadcast programs that are not currently viewed by the user from the electronic program guide (Step S22). Further, the reception quality notifying section 17 reads out reception quality data representing reception quality of the broadcast program currently viewed by the user. Still further, the reception quality notifying section 17 reads out a transmission mode of the broadcast program currently viewed by the user.

The reception quality notifying section 17 predicts reception qualities of the respective broadcast programs defined in the electronic program guide. At this point, the reception quality notifying section 17 predicts reception qualities of the respective broadcast programs in accordance with (i) the reception quality measured by the reception quality measuring section 16, (ii) the transmission mode of the broadcast program currently viewed by the user, and (iii) transmission modes of the respective broadcast programs defined in the electronic program guide. For example, when the transmission mode of the broadcast program currently viewed by the user is 16 QAM and the transmission mode of the broadcast program broadcasted 30 minutes later defined in the electronic program guide is also 16 QAM, the reception quality notifying section 17 predicts that the reception quality of the broadcast program broadcasted 30 minutes later is equal to the reception quality of the broadcast program currently viewed by the user.

The reception quality notifying section 17 notifies the user of the predicted reception quality of each broadcast program. This allows the user to objectively know not only the reception quality of the broadcast program currently viewed by the user, but also reception quality of other broadcast program that can be viewed in tuning to it and reception quality of a broadcast program that can be viewed in the future.

The reception quality notifying section 17 determines by calculation predicted reception qualities of all the broadcast programs, defined in the electronic program guide (Step S23). After having determined by calculation the predicted reception qualities, the reception quality notifying section 17 displays the predicted reception qualities of the broadcast programs on the mobile terminal device 1 concurrently with display of the electronic program guide on the mobile terminal device 1. In this manner, the reception quality notifying section 17 notifies the user of a list of the predicted reception qualities of the respective broadcast programs (Step S24).

After having notified the reception qualities, the mobile terminal device 1 determines whether to terminate reception of broadcast waves (Step S25). If having determined to terminate reception of broadcast waves (Yes), the mobile terminal device 1 terminates the reception quality notifying process. On the other hand, if having determined not to terminate reception of broadcast waves (No), the mobile terminal device 1 returns to Step S20 and the broadcast wave receiving section 12 receives broadcast waves again.

(Example of Electronic Program Guide)

Figure 7:
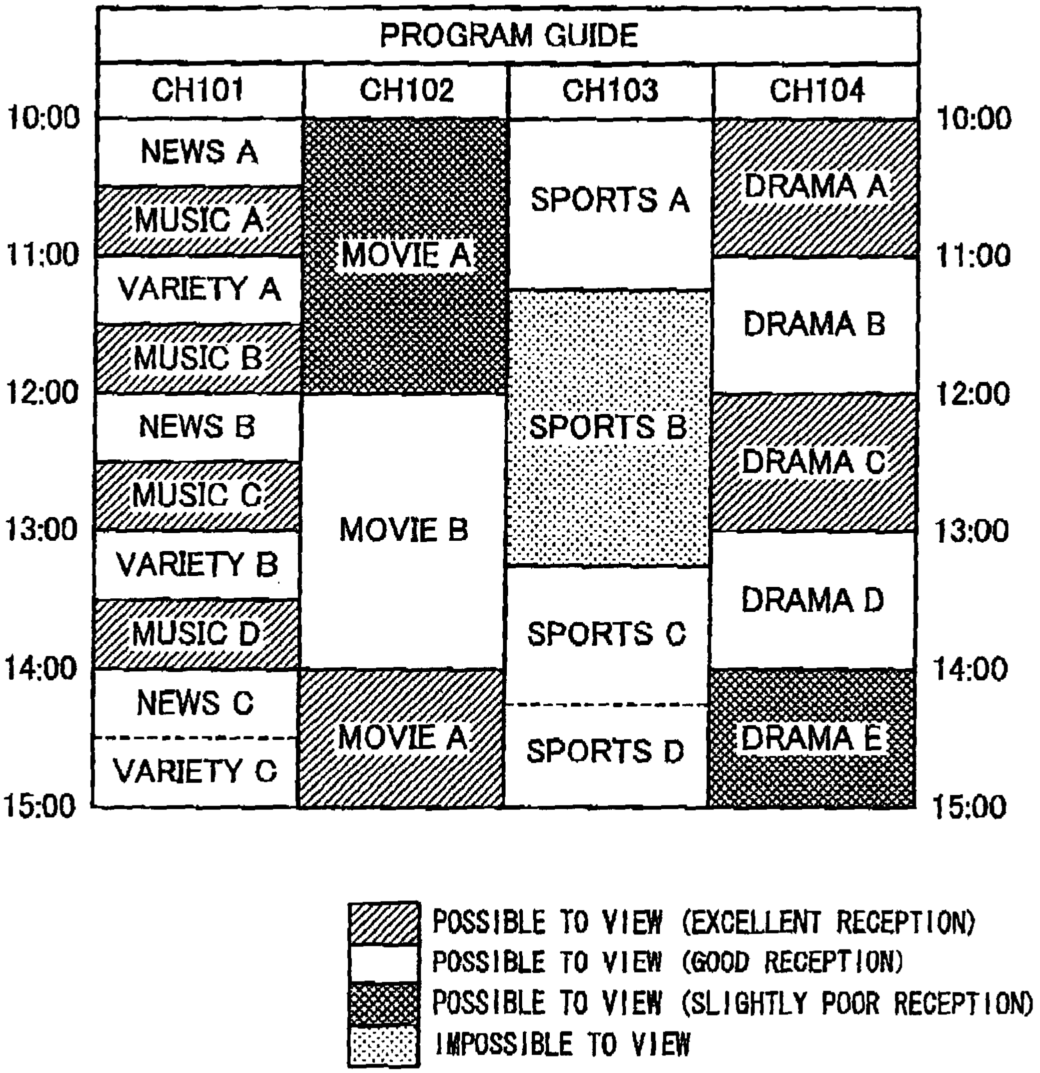
FIG. 7 is a drawing illustrating an exemplary electronic program guide displayed on the display by the reception quality notifying section.

The following will describe an exemplary electronic program guide which is displayed on the mobile terminal device 1 by the reception quality notifying section 17 with reference to FIG. 7. FIG. 7 is a drawing illustrating an exemplary electronic program guide displayed on the display 14 by the reception quality notifying section 17.

As illustrated in FIG. 7, the reception quality notifying section 17 displays the electronic program guide on the display 14, giving a color corresponding to the predicted reception quality on the background of display area of each broadcast program. That is, as to the broadcast program currently viewed by the user and the broadcast programs that can be viewed in the future, the reception quality notifying section 17 notifies the user of a list of their predicted reception qualities when the broadcast programs are viewed at a user's current location. When the user views such a reception quality list, the user can objectively know on the spot about which broadcast program the user can view in good conditions at a his/her current location, without tuning from one broadcast to another.

(Providing Base Station with Reception Quality)

The mobile terminal device 1 may provide the broadcast base station device 2 with the measured reception quality and the position where the reception quality was measured. As described above, in the mobile terminal device 1, the memory 11 stores therein the reception quality data and positional data. The data communications section 19 reads out the reception quality data and positional data from the memory 11, and transmits them to the communications base station device 3 which exists within data communications coverage of the mobile terminal device 1. The communications base station device 3 provides the broadcast base station device 2 with the received reception quality data and positional data via the communications network 4.

(Creating Reception Quality Map)

In the broadcast base station device 2, the data communications section 25 receives the quality data and positional data provided by the communications base station device 3. The data communications section 25 associates the received quality data and positional data with each other and stores them into the memory 26. This allows the data communications section 25 to create the reception quality map that represents reception quality distribution of the broadcast program in a service area covered by the broadcast base station device 2.

To one broadcast base station device 2, the reception quality data and positional data are transmitted from each of a plurality of mobile terminal devices 1 traveling in a service area. Each of the mobile terminal devices 1 travels from place to place in a service area of the broadcast base station device 2, providing the broadcast base station device 2 with the reception quality data and positional data at every place. Therefore, the broadcast base station device 2 can create more detailed reception quality map of its own service area with the passage of time.

The broadcast base station device 2 may provide the mobile terminal device 1 with the created reception quality map. That is, in the mobile terminal device 1, the user enters a command for displaying the reception quality map data on the display 14. With this, in the mobile terminal device 1, the data communications section 19 requests the broadcast base station device 2 to transmit the reception quality map data. In response to this request, in the broadcast base station device 2, for example, the data communications section 25 reads out the reception quality map data from the memory 26, and transmits it via the communications network 4 to the mobile terminal device 1. In the, the data communications section 19 receives the reception quality map data transmitted from the broadcast base station device 2, and stores the reception quality map data into the memory 11.

In the mobile terminal device 1, for example, the reception quality notifying section 17 reads out the reception quality map data from the memory 11 and provides a reception quality map represented by the read data on the display 14. This allows the user to know at once reception qualities of a broadcast program in areas around the user's current location. Therefore, for example, if reception quality is poor at the user's current location, the user can know where to move for improvement in reception quality of the broadcast program.

(Reception Route)

When the user enters his/her destination, the mobile terminal device 1 may notify the user of a route to the destination. In this arrangement, the mobile terminal device 1 can provide the user with a route that allows the user to continuously view a user-selected broadcast program in good conditions, as a specially recommended route. This example will be described below.

(Entering Destination)

The mobile terminal device 1 notifying the user of the reception route has a so-called navigation function. The user enters a destination into the mobile terminal device 1. Information on the destination is accepted by the input section 10, and stored into the memory 11. At this point, the user further instructs the mobile terminal device 1 to provide him/her with a route that allows the user to view the broadcast program in good conditions.

(Acquiring Quality Map)

In the mobile terminal device 1 having received this instruction, the positional information acquiring section 15 first acquires a current location of the mobile terminal device 1. The positional information acquiring section 15 stores the acquired information on the current location into the memory 11. At this point, the memory 11 stores therein (i) data representing the current location of the mobile terminal device 1 and (ii) data representing the user's destination. Then, the reception route calculating section 18 reads out the two pieces of data from the memory 11 and then calculates a quickest route to the destination on the basis of the two pieces of data by using the navigation function. This calculation may be a conventional and known method. Next, the reception route calculating section 18 judges whether or not the broadcast program can be viewed at each point on the calculated route. This judgment uses the quality map representing reception quality distribution from the current location of the mobile terminal device 1 to the user's destination. This quality map is provided from the broadcast base station device 2 and stored in the memory 11. When having judged that the broadcast program cannot be viewed at a certain midpoint on the route because of a poor reception quality, the reception route calculating section 18 calculates a second quickest route by using the navigation function. The reception route calculating section 18 judges again whether or not there is a point where the broadcast program cannot be viewed in the second quickest route newly determined by calculation.

By such a process, the reception route calculating section 18 calculates a route that allows the user to continuously view the broadcast program in good conditions from the current location of the mobile terminal device 1 to the user's destination. By following the route calculated by the reception route calculating section 18, the user can reach the destination while keeping on viewing the broadcast program.

Figure 8:
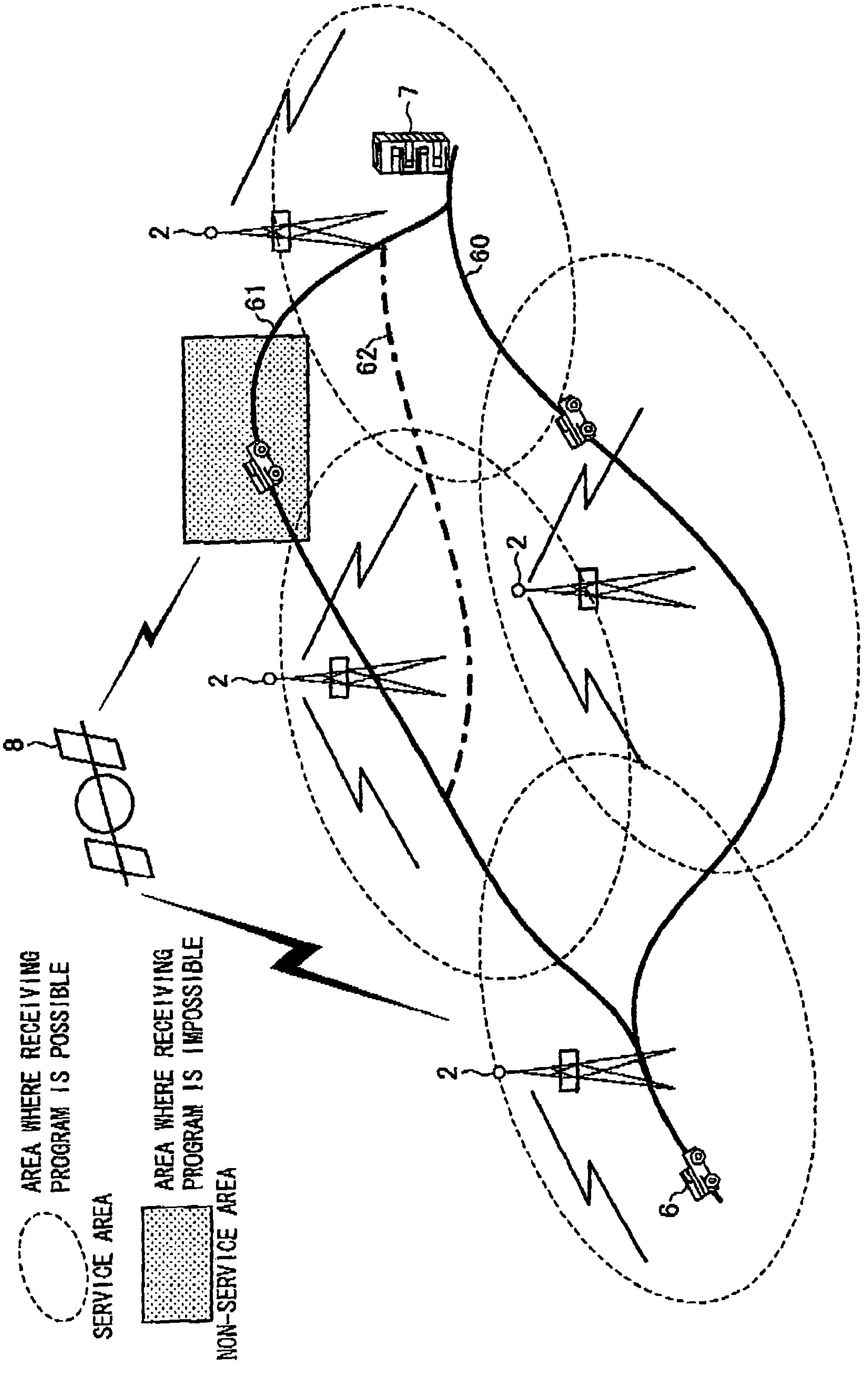
FIG. 8 is an exemplary drawing of an optimum reception route calculated by a reception route calculating section.

The following will describe the reception route calculated by the reception route calculating section 18 with reference to FIG. 8. FIG. 8 is an explanatory drawing of an exemplary reception route calculated by the reception route calculating section 18. In FIG. 8, the user riding in an automobile 6 carries the mobile terminal device 1. At this time, the user travels to a destination 7. In the mobile terminal device 1, the positional information acquiring section 15 acquires the current location of the mobile terminal device 1 via a GPS satellite 8.

At this point, in the mobile terminal device 1, the reception route calculating section 18 calculates, for example, a route 60 as a route that allows the user to continuously view the broadcast program. On the other hand, assume that the reception route calculating section 18 first calculates a route 61. The reception route calculating section 18, as illustrated in FIG. 8, judges that the route 61 includes points at which the user cannot view the broadcast program beyond service areas of the broadcast base station device 2. From this judgment, the reception route calculating section 18 calculates a route 62 as a new route that allows the user to continuously view the broadcast program.

(Calculating Reception Route as Close to the Broadcast Base Station Device as Possible)

The reception route calculating section 18 may calculate a route passing through a road as close to the broadcast base station device 2 as possible. Specifically, the reception route calculating section 18 calculates a route that ensures a maximum reception quality of a broadcast program. When the user selects such a route, it is possible to minimize the risk that the user could not view the broadcast program because of decrease in reception quality of the broadcast program during traveling.

The present invention is not limited to the description of the embodiments above, but may be altered by a skilled person within the scope of the claims. An embodiment based on a proper combination of technical means disclosed in different embodiments is encompassed in the technical scope of the present invention.

(Notifying Both Reception Quality Related to Broadcasting and Reception Quality Related to Communications)

The mobile terminal device 1 has the function of receiving and reproducing a broadcast program and the function of transmitting and receiving data. That is, the mobile terminal device 1 is a device including provisions for broadcasting and communications. The mobile terminal device 1 may notify the user of both reception quality related to broadcasting and reception quality related to communications.

To notify the user of the reception quality related to communications, the reception quality measuring section 16 measures, as reception quality related to communications, reception rate or error rate and an error rate of received data measured by the data communications section 19. This allows the reception quality notifying section 17 to notify the user of the reception quality related to communications, measured by the data communications section 19, by displaying it on the display 14.

(Measuring Reception Quality)

The reception quality measuring section 16 measures reception quality of a broadcast program by using arbitrary means. For example, the reception quality measuring section 16 measures the reception quality on the basis of electric field intensity of broadcast waves. In this case, electric field intensity of broadcast waves is standardized as the reception quality. Alternatively, the reception quality measuring section 16 may measure, as the reception quality of a broadcast program, a predetermined parameter derived from received broadcast waves, such as a S/N ratio (Signal to Noise Ratio) of broadcast waves, a C/N ratio (Carrier to Noise Ratio) of broadcast waves, the amount of received power, reception electric field intensity, or reception level.

(Acquiring and Providing Orientation of Terminal Device)

The mobile terminal device 1 may measure its own tilt angle when measuring the reception quality. For this arrangement, the mobile terminal device 1 includes a magnetic sensor for measuring its tilt angle. This magnetic sensor detects a tilt angle of the mobile terminal device 1 and stores it into the memory 11. In this arrangement, in the mobile terminal device 1, the data communications section 19 may notify the broadcast base station device 2 of information on orientation of the mobile terminal device 1 at the time of measurement of the reception quality. With this arrangement, the broadcast base station device 2 also manages information on orientation of each mobile terminal device 1 in the quality map.

The reception quality notifying section 17 may notify the user of mobile terminal device 1's orientation that realizes an optimum reception quality. In this case, the mobile terminal device 1 associates the orientation of the mobile terminal device 1, detected by the magnetic sensor, with the reception quality of the broadcast program, measured by the reception quality measuring section 16, and stores them into the memory 11. With this arrangement, the reception quality notifying section 17 reads out the orientation for optimum reception quality from the memory 11 and then notifies it to the user. According to this notification, the user changes orientation of the mobile terminal device 1 so as to optimize reception quality of the broadcast program.

(Use of Electromagnetic Waves for Communications)

The mobile terminal device 1 may receives a program data transmitted by electromagnetic waves of the mobile telephone, in accordance with the 1×PV-DO standard. In this arrangement, the reception quality measuring section 16 measures reception quality of a program by measuring electric field intensity or the like in the 1×EV-DO standard.

(Program and Storage Medium)

Finally, each block contained in the mobile terminal device 1 may be realized by hardware logic or may be realized by software by means of a CPU (Central Processing Unit) as described below.

That is, the mobile terminal device 1 includes a CPU that executes the order of a control program for realizing the aforesaid functions, ROM (Read Only Memory) that stores the control program, RAM (Random Access Memory) that develops the control program in executable form, and a storage device (storage medium) such as memory that stores the control program and various types of data therein.

With this arrangement, the objective of the present invention is realized in the following manner: this storage medium in which program codes (e.g. executable code program, intermediate code program, and source program) of the control program of the mobile terminal device 1 for realizing the aforesaid functions are stored in computer-readable manner is supplied to the mobile terminal device 1, and the mobile terminal device 1 as a computer (or CPU, MPU) reads the program codes from the storage medium and executes the same.

The storage medium for supplying the program codes to the mobile terminal device 1 is not limited to a storage medium of particular structure and particular type. That is, this storage medium may be tape based, such as a magnetic tape or cassette tape; disc based, such as a flexible disc or hard disk including a magnetic disc and CD-ROM/MO/MD/DVD/CD-R; card based, such as an IC card (including a memory card) and an optical card; or a semiconductor memory, such as a mask ROM, EPROM (Erasable Programmable Read Only Memory), EEPROM (Electrically Erasable Programmable Read Only Memory), and a flash ROM.

Alternatively, in order to achieve the objective of the present invention, the mobile terminal device 1 may be arranged so as to be connectable to a communications network so that the program codes are supplied through the communications network to the mobile terminal device 1. The communications network is not to be particularly limited, provided that the program codes are supplied to the mobile terminal device 1 through it. Examples of the communications network includes the Internet, intranet, extranet, LAN, ISDN, VAN, CATV communications network, virtual private network, telephone network, mobile communications network, and satellite communications network.

A transmission medium constituting the communications network are not to be particularly limited, provided that it is any medium that can transmit the program codes. Examples of the transmission medium includes cables such as IEEE1394, USB (Universal Serial Bus), power-line carrier, cable TV lines, telephone lines, ADSL (Assymmetric Digital Subscriber Line) lines, and wireless connections such as IrDA and remote control using infrared light, Bluetooth®, 802.11, HDR, mobile phones, satellite connections, and terrestrial digital broadcasting.

Note that the present invention can be also realized by the program codes in the form of a computer data signal embedded in a carrier wave which is embodied by electronic transmission.

Note that, the mobile terminal device may be realized by a computer. In this arrangement, the present invention also includes: a reception quality notification program that realizes the mobile terminal device by a computer in such a manner that the computer is caused to operate as the foregoing means; and a computer-readable storage medium storing the reception quality notification program.

Moreover, it is preferable that the mobile terminal device according to the present invention further comprises: electronic program guide acquiring means which acquires an electronic program guide including transmission modes defined for respective broadcast programs; and reception quality predicting means which predicts reception qualities of the broadcast programs, in accordance with the reception quality measured by the reception quality measuring means, a transmission mode of a currently-received broadcast program, and the transmission modes of the respective broadcast programs defined in the electronic program guide, wherein: the reception quality notifying means notifies the user of the reception qualities of the respective broadcast programs, predicted by the reception quality predicting means.

According to the above arrangement, the electronic program guide acquiring means acquires an electronic program guide. The electronic program guide includes transmission modes defined for the respective broadcast programs. For example, one broadcast program has a transmission mode of 16 QAM, whereas another broadcast program has a transmission mode of QPSK.

The reception quality predicting means predicts reception qualities of the broadcast programs defined in the electronic program guide. At this moment, the reception quality predicting means predicts the reception qualities of the broadcast programs in accordance with the reception quality measured by the reception quality measuring means, a transmission mode of a currently-received broadcast program, and the transmission modes of the respective broadcast programs defined in the electronic program guide. For example, when the transmission mode of the broadcast program currently viewed by the user is 16 QAM and the transmission mode of the broadcast program broadcasted 30 minutes later defined in the electronic program guide is also 16 QAM, the reception quality notifying means predicts that the reception quality of the broadcast program broadcasted 30 minutes later is equal to the reception quality of the broadcast program currently viewed by the user.

The reception quality notifying means notifies the user of the reception quality of each broadcast program predicted by the reception quality predicting means. This allows the user to objectively know not only the reception quality of the broadcast program currently viewed by the user, but also reception quality of other broadcast program that can be viewed in tuning to it and reception quality of a broadcast program that can be viewed in the future.

Therefore, the mobile terminal device brings about the effect of letting the user know in advance about which broadcast program the user can view in good conditions, without tuning from one broadcast to another.

Moreover, it is preferable that the mobile terminal device according to the present invention, further comprises: reception quality predicting means which predicts a future course of the reception quality in accordance with past progression of the measured reception quality over time, wherein: the reception quality notifying means notifies the user of the reception quality predicted by the reception quality predicting means.

According to the above arrangement, the reception quality predicting means predicts a future course of the reception quality in accordance with past progression of the measured reception quality over time. For example, if reception quality was good for past 30 minutes, the reception quality predicting means predicts that this reception quality will be maintained for next 30 minutes. Further, if reception quality gradually decreases for past 30 minutes, the reception quality predicting means predicts that the reception quality will keep decreasing in the future, and finally, reception quality required for viewing will not be obtained.

In the mobile terminal device, the reception quality notifying means notifies the user of the reception quality predicted by the reception quality predicting means. With this arrangement, the user who has been notified a result of the prediction can decide, in accordance with the prediction result, whether or not he/she will keep on viewing the broadcast program. For example, if reception quality of the broadcast program will be good in the future, the user decides to keep on viewing the broadcast program. On the other hand, if reception quality of the broadcast program will decrease in the future, the user decides to move to another place for viewing the broadcast program.

Thus, the mobile terminal device brings about the effect of urging the user to take an action best-suited to viewing a broadcast program.

Moreover, the mobile terminal device according to the present invention is preferably arranged such that when a time resulting from addition of a predetermined reference time to a current time is equal to a designated time at which said mobile terminal device is preset to record the broadcast program, the reception quality notifying means notifies the user of reception quality of the broadcast program which the mobile terminal device is preset to record.

According to the above arrangement, when a time resulting from addition of a predetermined reference time to a current time is equal to a designated time at which said mobile terminal device is preset to record the broadcast program, the reception quality notifying means notifies the user of reception quality of the broadcast program. For example, assume that the predetermined reference time is five minutes. In this case, when a current time is five minutes before the designated time, the reception quality predicting means predicts reception quality of the broadcast program which the mobile terminal device is preset to record, in accordance with its transmission mode defined in the electronic program guide, as described above. The predicted reception quality is notified to the user by the reception quality notifying means.

With this arrangement, the user can know in advance whether or not the user-designated broadcast program will be recorded in good conditions. Therefore, the mobile terminal device brings about the effect that prediction of a poor reception quality makes it possible to prevent wasteful recording of the broadcast program.

Moreover, the mobile terminal device according to the present invention is preferably arranged such that when said mobile terminal device is put on charge, the reception quality notifying means notifies the user of the reception quality.

According to the above arrangement, when the mobile terminal device is put on charge, e.g. when the mobile terminal device is connected to a battery charger, the reception quality notifying means notifies the user of the reception quality. That the mobile terminal device is put on charge means that there is a high possibility that the user continues to place the mobile terminal device at a certain location without traveling. Therefore, the reception quality notifying means brings about the effect of by notifying the user of reception quality of a broadcast program at a particular location, notifying the user of the reception quality in the case when the user keeps on viewing the broadcast program at that place.

Moreover, it is preferable that the mobile terminal device according to the present invention further comprises: position acquiring means which acquires positional information of said mobile terminal device when the reception quality measuring means measures the reception quality; and reception quality providing means which provides the reception quality and the positional information to a predetermined broadcast base station device transmitting a broadcast program to said mobile terminal device.

According to the above arrangement, the position acquiring means acquires positional information of said mobile terminal device when the reception quality measuring means measures the reception quality of the broadcast program. In this arrangement, the position acquiring means uses the GPS system, for example. Further, in the mobile terminal device, the reception quality providing means provides the reception quality measured by the reception quality measuring means and the positional information acquired by the position acquiring means, to the broadcast base station device. This allows the broadcast base station device to create, for example, the quality map representing reception quality distribution in a service area covered by the broadcast base station device, by using the reception quality provided from the mobile terminal device and the positional information of the mobile terminal device. That is, this arrangement brings about the effect of realizing the mobile terminal device capable of providing useful information to the broadcast base station device.

Moreover, it is preferable that the mobile terminal device according to the present invention is arranged such that the reception quality notifying means notifies the user of distribution of the reception quality in areas around a current location of said mobile terminal device.

According to the above arrangement, the reception quality notifying means notifies the user of distribution of the reception quality in areas around a current location of said mobile terminal device. Such a distribution is created in advance by the broadcast base station device having collected information from the mobile terminal device, and is provided to the mobile terminal device, if necessary. Knowing the reception quality distribution around the current location brings about the effect that when the user can know where he/she should be move to view a broadcast program if he/she cannot view the broadcast program in good conditions because of a poor reception quality.

Moreover, it is preferable that the mobile terminal device according to the present invention further comprises: route calculating means which calculates a route that allows the user to continuously view the broadcast program from a current location of said mobile terminal device to a destination of the user.

According to the above arrangement, the route calculating means calculates a route that allows the user to continuously view the broadcast program from a current location of said mobile terminal device to a destination of the user. In this arrangement, the mobile terminal device determines the current location by the GPS system, for example. The destination of the user is entered in the mobile terminal device by the user. With this, the route calculating means calculates a quickest route to the destination by using a so-called navigation system. Next, the route calculating means judges whether or not the broadcast program can be viewed at the points on the calculated route. This judgment uses the quality map representing reception quality distribution from the current location of the mobile terminal device to the user's destination. On the way to the destination, if judging that it is impossible to view the broadcast program because of a poor reception quality, the route calculating means judges a new route that allows viewing of the broadcast program.

With such an information processing, the route calculating means calculates a route that allows the user to continuously view the broadcast program in good conditions from the current location of the mobile terminal device to the destination of the user. The mobile terminal device brings about the effect that the user following the route calculated by the route calculating means can reach the destination while keeping on viewing the broadcast program.

Moreover, it is preferable that the mobile terminal device according to the present invention further comprises: reception quality predicting mean which predicts reception quality of the broadcast program at a destination of the user in accordance with a quality map representing reception quality distribution of the broadcast program.

According to the above arrangement, the reception quality predicting means predicts reception quality of the broadcast program at a destination of the user. This brings about the effect that the user can know in advance whether he/she can view an intended broadcast program at the destination.

As described above, since the mobile terminal device according to the present invention comprises the reception quality notifying means which notifies the user of reception quality of a broadcast program, it brings about the effect of being capable of letting the user know about whether the user can stably view the program.

The present invention can be widely used as a mobile terminal device which receives and reproduces a broadcast program on air.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A mobile terminal device which receives and reproduces a broadcast program on air, comprising:

a reception quality measuring unit which measures reception quality of the broadcast program;

a reception quality notifying unit which notifies a user of the measured reception quality;

a reception quality predicting unit which predicts reception quality; and an electronic program guide acquiring unit acquires an electronic program guide including transmission modes defined for respective broadcast programs, wherein:

the reception quality predicting unit predicts a future course of the reception quality in accordance with past progression of the measured reception quality over time, the reception quality predicting unit predicts reception qualities of the broadcast programs, in accordance with the reception quality measured by the reception quality measuring unit, a transmission mode of a currently-received broadcast program, and the transmission modes of the respective broadcast programs defined in the electronic program guide, and the reception quality notifying unit notifies the user of the reception qualities of the respective broadcast programs, predicted by the reception quality predicting unit.

2. The mobile terminal device according to claim 1, wherein:

the reception quality measuring unit measures the reception quality by measuring electric field intensity of the broadcast waves.

3. The mobile terminal device according to claim 1, wherein:

when a time resulting from addition of a predetermined reference time to a current time is equal to a designated time at which said mobile terminal device is preset to record the broadcast program, the reception quality notifying unit notifies the user of reception quality of the broadcast program which the mobile terminal device is preset to record.

4. The mobile terminal device according to claim 1, wherein:

when said mobile terminal device is put on charge, the reception quality notifying unit notifies the user of the reception quality.

5. The mobile terminal device according to claim 1, further comprising:

a position acquiring unit which acquires positional information of said mobile terminal device when the reception quality measuring unit measures the reception quality; and a reception quality providing unit which provides the reception quality and the positional information to a predetermined broadcast base station device transmitting a broadcast program to said mobile terminal device.

6. The mobile terminal device according to claim 1, wherein:

the reception quality notifying unit notifies the user of distribution of the reception quality in areas around a current location of said mobile terminal device.

7. The mobile terminal device according to claim 1, further comprising:

a route calculating unit which calculates a route for the user to follow and for the user to continuously view the broadcast program from a current location of said mobile terminal device to a destination specified by the user, wherein if an initial calculated route does not allow for the broadcast program to be continuously viewed, an alternative route is calculated.

8. The mobile terminal device according to claim 1, wherein:

the reception quality predicting unit which predicts reception quality of the broadcast program at a destination of the user in accordance with a quality map representing reception quality distribution of the broadcast program.

9. The mobile terminal device according to claim 1, wherein the reception quality notifying unit displays different colors, each of the different colors represent a different reception quality based on the measured reception quality.

10. The mobile terminal device according to claim 9, wherein the different colors includes a first color that indicates the measured reception quality is good and a second color that indicates the measured reception quality is poor.

11. The mobile terminal device according to claim 10, wherein the different colors further includes a third color that indicates the measured reception quality is at a level that the broadcast program cannot be displayed.

12. The mobile terminal device according to claim 1, wherein the reception quality notifying unit displays different colors on an outer edge of a display, each of the different colors represent a different reception quality based on the measured reception quality.

13. A broadcast base station device comprising:

a reception quality acquiring unit which acquires, from a mobile terminal device which receives and reproduces a broadcast program on air, comprising:

a reception quality measuring unit which measures reception quality of the broadcast program;

a reception quality notifying unit which notifies a user of the measured reception quality;

a reception quality predicting unit which predicts a future course of the reception quality in accordance with past progression of the measured reception quality over time;

a position acquiring unit which acquires positional information of said mobile terminal device when the reception quality measuring unit measures the reception quality;

an electronic program guide acquiring unit acquires an electronic program guide including transmission modes defined for respective broadcast programs, the reception quality and the positional information of the mobile terminal device; and a quality map creating unit which creates a quality map representing reception quality distribution in a predetermined service area, the quality map including the reception quality and the positional information associated with each other;

wherein:

the reception quality predicting unit predicts reception qualities of the broadcast programs, in accordance with the reception quality measured by the reception quality measuring unit, a transmission mode of a currently-received broadcast program, and the transmission modes of the respective broadcast programs defined in the electronic program guide, and the reception quality notifying unit notifies the user of the reception qualities of the respective broadcast programs, predicted by the reception quality predicting unit.

14. A reception quality notification method for causing a mobile terminal device which receives and reproduces a broadcast program on air to notify a user of reception quality of the broadcast program, the method comprising:

measuring reception quality of the broadcast program;

notifying the user of the measured reception quality;

predicting a future course of a reception quality in accordance with past progression of the measured reception quality over time;

acquiring an electronic program guide including transmission modes defined for respective broadcast programs;

predicting reception qualities of the broadcast programs, in accordance with the reception quality measured, a transmission mode of a currently-received broadcast program, and the transmission modes of the respective broadcast programs defined in the electronic program guide; and notifying the user of the predicted reception qualities of the respective broadcast programs.

15. A broadcasting system comprising:

a mobile terminal device which receives and reproduces a broadcast program on air, comprising:

a reception quality measuring unit which measures reception quality of the broadcast program;

a reception quality notifying unit which notifies a user of the measured reception quality;

a reception quality predicting unit which predicts a future course of the reception quality in accordance with past progression of the measured reception quality over time;

a position acquiring unit which acquires positional information of said mobile terminal device when the reception quality measuring unit measures the reception quality; and an electronic program guide acquiring unit acquires an electronic program guide including transmission modes defined for respective broadcast programs, wherein:

the reception quality predicting unit predicts reception qualities of the broadcast programs, in accordance with the reception quality measured by the reception quality measuring unit, a transmission mode of a currently-received broadcast program, and the transmission modes of the respective broadcast programs defined in the electronic program guide; and the reception quality notifying unit notifies the user of the reception qualities of the respective broadcast programs, predicted by the reception quality predicting unit; and a broadcast base station device comprising:

a reception quality acquiring unit which acquires, from the mobile terminal device, the reception quality and the positional information of the mobile terminal device; and a quality map creating unit which creates a quality map representing reception quality distribution in a predetermined service area, the quality map including the reception quality and the positional information associated with each other.

16. A reception quality notification program for operating a mobile terminal device which receives and reproduces a broadcast program on air, comprising:

a reception quality measuring unit which measure reception quality of the broadcast program;

a reception quality notifying unit which notifies a user of the measured reception quality;

a reception quality predicting unit which predicts future reception quality based on past progression of the measured reception quality over time; and an electronic program guide acquiring unit acquires an electronic program guide including transmission modes defined for respective broadcast programs, the program causing a computer to function as the foregoing units;

wherein:

the reception quality predicting unit predicts reception qualities of the broadcast programs, in accordance with the reception quality measured by the reception quality measuring unit, a transmission mode of a currently-received broadcast program, and the transmission modes of the respective broadcast programs defined in the electronic program guide, and the reception quality notifying unit notifies the user of the reception qualities of the respective broadcast programs, predicted by the reception quality predicting unit.

17. A computer-readable storage medium storing therein a reception quality notification program for operating a mobile terminal device which receives and reproduces a broadcast program on air, comprising:

a reception quality measuring unit which measures reception quality of the broadcast program;

a reception quality notifying unit which notifies a user of the measured reception quality;

a reception quality predicting unit which predicts future reception quality based on past progression of the measured reception quality over time; and an electronic program guide acquiring unit acquires an electronic program guide including transmission modes defined for respective broadcast programs, the program causing a computer to function as the foregoing units;

wherein:

the reception quality predicting unit predicts reception qualities of the broadcast programs, in accordance with the reception quality measured by the reception quality measuring unit, a transmission mode of a currently-received broadcast program, and the transmission modes of the respective broadcast programs defined in the electronic program guide, and the reception quality notifying unit notifies the user of the reception qualities of the respective broadcast programs, predicted by the reception quality predicting unit.

* * * * *